US010726687B2

(12) United States Patent
Song et al.

(10) Patent No.: US 10,726,687 B2
(45) Date of Patent: Jul. 28, 2020

(54) DIRECTED ALERT NOTIFICATION BY AUTONOMOUS-DRIVING VEHICLE

(71) Applicant: Pony AI Inc., Grand Cayman (KY)

(72) Inventors: Hao Song, Sunnyvale, CA (US); Zhuo Zhang, Fremont, CA (US); Sinan Xiao, Fremont, CA (US); Xiang Yu, Santa Clara, CA (US); Tiancheng Lou, Milpitas, CA (US); Jun Peng, Fremont, CA (US); Jie Hou, San Francisco, CA (US); Tianyi Li, San Jose, CA (US); Yiming Liu, San Jose, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/579,238

(22) Filed: Sep. 23, 2019

(65) Prior Publication Data

US 2020/0020212 A1 Jan. 16, 2020

Related U.S. Application Data

(63) Continuation of application No. 15/908,272, filed on Feb. 28, 2018, now Pat. No. 10,460,577.

(51) Int. Cl.
| | |
|---|---|
| *G08G 1/16* | (2006.01) |
| *G08B 7/06* | (2006.01) |
| *G05D 1/02* | (2020.01) |
| *G05D 1/00* | (2006.01) |
| *B60Q 1/52* | (2006.01) |
| *G08G 1/005* | (2006.01) |
| *B60Q 1/50* | (2006.01) |
| *B60Q 9/00* | (2006.01) |
| *B60W 30/08* | (2012.01) |
| *G01S 19/51* | (2010.01) |
| *B60R 21/34* | (2011.01) |

(52) U.S. Cl.
CPC ............ *G08B 7/06* (2013.01); *G05D 1/0088* (2013.01); *G05D 1/0212* (2013.01); *G05D 1/0214* (2013.01); *G05D 1/0248* (2013.01); *G08G 1/16* (2013.01); *G08G 1/166* (2013.01); *B60Q 1/506* (2013.01); *B60Q 1/525* (2013.01); *B60Q 9/008* (2013.01); *B60R 21/34* (2013.01); *B60W 30/08* (2013.01); *G01S 19/51* (2013.01); *G08G 1/005* (2013.01)

(58) Field of Classification Search
CPC .......... G08G 1/16; G08G 1/166; G01S 19/51; G05D 1/021; G05D 1/0212; G05D 1/0214; B60R 21/34
See application file for complete search history.

(56) References Cited

U.S. PATENT DOCUMENTS

| | | |
|---|---|---|
| 7,769,544 B2 | 8/2010 | Blesener et al. |
| 8,996,224 B1 | 3/2015 | Herbach et al. |

(Continued)

*Primary Examiner* — Benyam Haile
(74) *Attorney, Agent, or Firm* — Sheppard Mullin Richter & Hampton LLP

(57) ABSTRACT

A system included and a computer-implemented method performed in an autonomous-driving vehicle are described. The system performs: detecting one or more movable objects; determining a target movable object from the one or more detected objects; determining a manner of generating a directed alert notification selectively toward the target movable object; and causing a directed alert notification of the determined manner to be generated toward the target movable object.

20 Claims, 4 Drawing Sheets

(56) References Cited

U.S. PATENT DOCUMENTS

| | | | |
|---|---|---|---|
| 9,384,645 B1* | 7/2016 | Allen | G08B 3/10 |
| 9,767,516 B1 | 9/2017 | Konrardy et al. | |
| 9,841,767 B1 | 12/2017 | Hayward | |
| 9,940,834 B1 | 4/2018 | Konrardy et al. | |
| 10,156,848 B1 | 12/2018 | Konrardy et al. | |
| 10,395,332 B1 | 8/2019 | Konrardy et al. | |
| 2008/0303696 A1* | 12/2008 | Aso | G08G 1/161 |
| | | | 340/935 |
| 2015/0329043 A1* | 11/2015 | Skvarce | B60W 30/085 |
| | | | 340/435 |
| 2019/0001973 A1 | 1/2019 | Matsunaga et al. | |

* cited by examiner

DIRECTED ALERT NOTIFICATION BY AUTONOMOUS-DRIVING VEHICLE

CROSS REFERENCE TO RELATED APPLICATIONS

This application is a continuation of U.S. application Ser. No. 15/908,272, filed Feb. 28, 2018, the content of which is hereby incorporated by reference in its entirety.

BACKGROUND

Autonomous-driving vehicles such as vehicles that autonomously operate with limited human inputs or without human inputs are expected in various fields. Autonomous driving of such autonomous-driving vehicles may involve movement of the autonomous-driving vehicles in a counterintuitive manner to humans, such as harsh braking, swift swerving, straight path of driving without avoiding obstacles that appears to damage a vehicle, because a best course of movement determined by the autonomous-driving vehicles for safety and/or cost efficient purposes may be different from a course of movement predicted by humans. For that reason, humans or vehicles driven by humans may proceed to a direction that crosses a driving direction of an autonomous-driving vehicle, which may lead to traffic incidents. Therefore, it may be necessary for autonomous-driving vehicles to have operation thereof to be sufficiently perceived by humans in the traffic to avoid traffic incidents.

These and other issues are addressed, resolved, and/or reduced using techniques described herein. The foregoing examples of the related art and limitations related therewith are intended to be illustrative and not exclusive. Other limitations of the related art will become apparent to those of skill in the relevant art upon a reading of the specification and a study of the drawings.

SUMMARY

Described herein are a system included in and a computer-implemented method performed in an autonomous-driving vehicle. The system includes one or more processors; and a memory storing instructions that, when executed by the one or more processors.

In one embodiment, the disclosure describes a system that performs: A system included and a computer-implemented method performed in an autonomous-driving vehicle are described. The system performs: detecting one or more movable objects; determining a target movable object from the one or more detected objects; determining a manner of generating a directed alert notification selectively toward the target movable object; and causing a directed alert notification of the determined manner to be generated toward the target movable object.

In some embodiments, the determining the target movable object comprises: determining a vehicle route of the autonomous-driving vehicle; determining predicted moving paths of the detected one or more movable objects; determining one or more of the detected one or more movable objects that are predicted to be within a predetermined distance from the autonomous-driving vehicle as one or more candidate movable objects, based on the vehicle route and the predicted moving paths of the one or more movable objects; and determining the target movable object from the one or more candidate movable objects.

In some embodiments, the system is caused to further determine one or more perceptibility parameters corresponding to the target movable object at least based on a portion of image data corresponding to the target movable object. In some embodiments, the one or more perceptibility parameters comprises at least one of a visual perceptibility level, an acoustic perceptibility level, a somatosensory perceptibility level, and a via-electronic-device perceptibility level. In some embodiments, the one or more perceptibility parameters corresponding to the target movable object are determined also based on one or more environmental attributes, including one or more of weather condition, an ambient brightness level, and an ambient noise level.

In some embodiments, the manner of generating a directed alert notification comprises a type of the directed alert notification, and said determining the manner of generating the directed alert notification comprises selecting the type of the directed alert notification from a group including one or more of a visual directed alert notification, an acoustic directed alert notification, a somatosensory directed alert notification, and an electromagnetic directed alert notification, at least based on the one or more perceptibility parameters.

In some embodiments, the manner of generating a directed alert notification comprises a position to which the directed alert notification is directed, and said determining the manner of generating the directed alert notification comprises determining the timing at which the directed alert notification is generated, at least based on the one or more perceptibility parameters.

In some embodiments, the manner of generating a directed alert notification comprises timing at which the directed alert notification is generated, and said determining the manner of generating the directed alert notification comprises determining the timing at which the directed alert notification is generated, at least based on the one or more perceptibility parameters.

In some embodiments, the target movable object is one of a pedestrian, a person on a human-powered vehicle, a person on a motor vehicle, and an animal.

In some embodiments, the system is caused to further determine a predicted movement of the target movable object in response to the directed alert notification, and control a locomotive mechanism of the autonomous-driving vehicle based on the predicted movement of the target movable object.

In one embodiment, the disclosure describes a computer-implemented method performed in an autonomous-driving vehicle. The method comprises: detecting one or more movable objects; determining a target movable object from the one or more detected objects; determining a manner of generating a directed alert notification selectively toward the target movable object; and causing a directed alert notification of the determined manner to be generated toward the target movable object.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
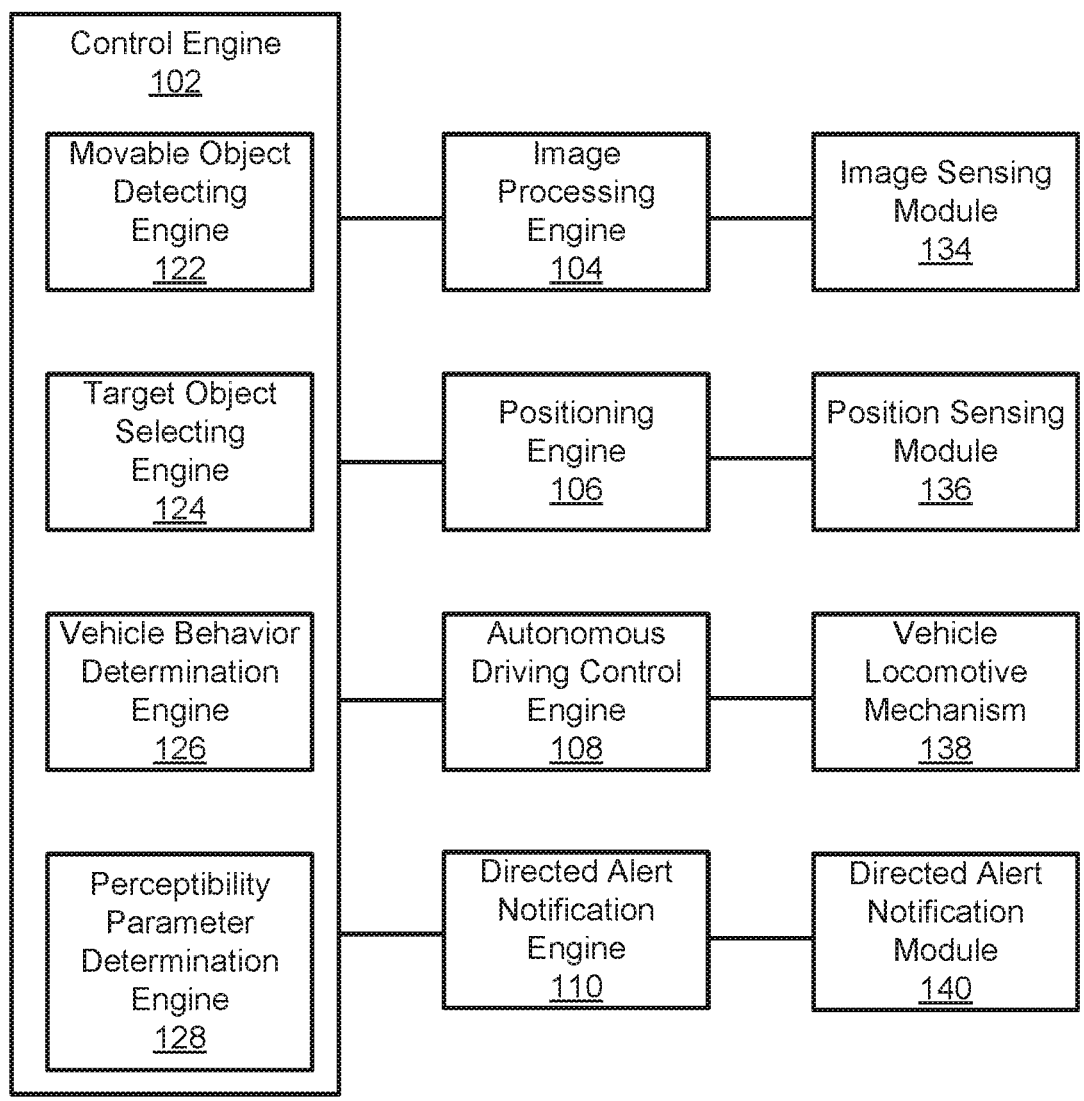
FIG. 1 is a schematic diagram depicting an example of an autonomous-driving vehicle system according to an embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to a system included in an autonomous-driving vehicle (or simply autonomous vehicle) and a computer-implemented method performed in an autonomous-driving vehicle. In a specific implementation, the system and the computer-implemented method are intended to provide a directed alert notification toward an object that is likely to enter a proximate region to an autonomous driving vehicle to avoid traffic incidents. The technology in certain implementations of the present disclosure can also make the driving decisions of the autonomous driving vehicle easily anticipatable by other road users and thus provide such users the comfort that they can safely share the road with autonomous driving vehicles.

One embodiment provides systems and methods for interacting with surrounding road users (e.g., pedestrians and vehicles, which can be autonomous or human-driven, can be in opposite direction or in the same direction). The system can automatically choose an appropriate method of notification based on environmental conditions. For instance, one method entails projecting a light spot on a vehicle or pedestrian who is within the planned trajectory of the autonomous vehicle. The light spot can be projected by an appropriate laser pointer, so that it is easily noticeable to the pedestrian or the human driver of the vehicle being pointed, yet still safe to humans. In another example, heat can be delivered to a specific body part surface of the pedestrian who is within the planned trajectory. The heat can be delivered through specially designed disk heater which delivers heat in a specific direction.

Another embodiment enables detection of the pedestrian's posture or the vehicle's orientation to determine the optimal spot on the body of the pedestrian or vehicle to achieve good result and avoid potential injuries (e.g. avoid projecting light directly into any people's eye). For example, when the autonomous vehicle detects a pedestrian who is distracted by a handheld device and is on a collision course of the autonomous vehicle, in addition to taking actions (e.g., braking) on its own, the vehicle can also notify the pedestrian at the same time and remind the pedestrian to focus on the road.

In a specific implementation, the system performs: detecting one or more movable objects; determining a target movable object from the one or more detected objects; determining a manner of generating a directed alert notification selectively toward the target movable object; and causing a directed alert notification of the determined manner to be generated toward the target movable object.

FIG. 1 is a schematic diagram depicting an example of an autonomous-driving vehicle system 100 according to an embodiment. In the example depicted in FIG. 1, the autonomous-driving vehicle system 100 includes a control engine 102, and an image processing engine 104, a positioning engine 106, an autonomous-driving control engine 108, and a directed alert notification engine 110 coupled to the control engine 102. The autonomous-driving vehicle system 100 also includes an image sensing module 134 coupled to the image processing engine 104, a position sensing module 136 coupled to the positioning engine 106, a vehicle locomotive mechanism 138 coupled to the autonomous driving control engine 108, and a directed alert notification module 140 coupled to the directed alert notification engine 110.

In the example depicted in FIG. 1, the autonomous-driving vehicle system 100 is intended to represent a system primarily mounted on an autonomous-driving vehicle, which is capable of sensing its environment and navigating with a limited human input or without human input. The "vehicle" discussed in this paper typically includes a vehicle that drives on the ground, such as wheeled vehicles, and may also include a vehicle that flies in the sky (e.g., drones, helicopter, airplanes, and so on). The "vehicle" discussed in this paper may or may not accommodate one or more passengers therein.

In one embodiment, the autonomous-driving vehicle includes a vehicle that controls braking and/or acceleration without real time human input. In another embodiment, the autonomous-driving vehicle includes a vehicle that controls steering without real time human input based on inputs from one or more lens mount units. In another embodiment, the autonomous-driving vehicle includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control movement of a non-autonomous-driving vehicle, such as gear shifting, steering control, braking pedal control, accel pedal control, crutch pedal control, and so on.

In one embodiment, the autonomous-driving vehicle system 100 is capable of sensing its environment based on inputs from one or more imaging devices (e.g., camera) mounted on the autonomous-driving vehicle system 100. In an embodiment, the autonomous-driving vehicle system 100 is configured to analyze image data obtained from the one or more imaging devices and identify objects (e.g., traffic signals, road signs, other vehicles, pedestrians, and obstacles) included in images of the analyzed image data. In one embodiment, the autonomous-driving vehicle system 100 is also capable of performing an autonomous-driving operation based on the identified objects. In an embodiment, the autonomous-driving vehicle system 100 is also capable of drive the vehicle so as to follow a traffic stream without hitting the identified objects. For example, the autonomous-driving vehicle system 100 follow traffic signals identified based on image data, follow traffic signs identified based on image data, and drive with a sufficient distance from preceding vehicles.

In the example of FIG. 1, the autonomous-driving vehicle system 100 is also capable of communicating with systems or devices connected to the autonomous-driving vehicle system 100 through a network. In an embodiment, the autonomous-driving vehicle system 100 communicates with a server via the network. For example, the autonomous-driving vehicle system 100 pulls up from the server map information (e.g., local map, parking structure map, floor plan of buildings, and etc.) of a region around the autonomous-driving vehicle. In another example, the autonomous-driving vehicle system 100 periodically notifies information of the autonomous-driving vehicle system 100 such as locations and directions thereof to the server.

In some embodiments, the network is intended to represent a variety of potentially applicable technologies. For example, the network can be used to form a network or part of a larger network. Where two components are co-located on a device, the network can include a bus or other data conduit or plane. Depending upon implementation-specific or other considerations, the network can include wired communication interfaces and wireless communication interfaces for communicating over wired or wireless communication channels. Where a first component is located on a first device and a second component is located on a second (different) device, the network can include a wireless or wired back-end network or LAN. The network can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the network can include a private cloud under the control of an enterprise or third party, or a public cloud.

In an embodiment, the autonomous-driving vehicle system 100 communicates with one or more other autonomous-driving vehicle systems via the network. For example, the autonomous-driving vehicle system 100 sends information of a vehicle route of the corresponding autonomous-driving vehicle to the one or more other autonomous-driving vehicle systems, such that traffic incidents such as collisions can be prevented. In another example, the autonomous-driving vehicle system 100 commands one or more other autonomous-driving police systems to proceed to a particular location so as to avoid traffic incidents.

In the example depicted in FIG. 1, the control engine 102 is intended to represent specifically-purposed hardware and software configured to control overall operation of the autonomous-driving vehicle system 100. For example, the control engine 102 controls operations of the image processing engine 104, the positioning engine 106, the autonomous driving control engine 108, and the directed alert notification engine 110. The control engine 102 includes a movable object detecting engine 122, a target object selecting engine 124, a vehicle behavior determination engine 126, and a perceptibility parameter determination engine 128.

In the example depicted in FIG. 1, the image processing engine 104 is intended to represent specifically-purposed hardware and software configured to carry out image processing of image data of scene images generated by the imaging sensing module 134. In a specific example, the scene images include road signs, traffic signals, lane lines, other vehicles, pedestrians, buildings, and so on. In an embodiment, the image processing engine 104 is configured to detect objects included in each of the scene images. In a specific example, the image processing engine 104 detects objects based on a contour line (high contrast region) included in the scene images.

In the example depicted in FIG. 1, the imaging sensing module 134 is intended to represent specifically-purposed hardware and software configured to capture scene images and generate image data thereof. In a specific implementation, the imaging sensing module 134 includes an image sensor, such as CCD and CMOS sensors, an infrared image sensor, and so on. Depending on a specific implementation and other consideration, the imaging sensing module 134 may include two or more image sensors, and may be or may not be mounted on an autonomous-driving vehicle corresponding to the autonomous-driving vehicle system 100. For example, the imaging sensing module 134 may include one or more images sensors mounted on the autonomous-driving vehicle and one or more images sensors that are not mounted on the autonomous-driving vehicle, and rather placed at external places, such as street lamps, traffic signals, other vehicles, buildings, and so on.

In an embodiment, the image processing engine 104 is configured to identify each object included in the scene images based on image processing of the image data thereof, in accordance with an image recognition technique. For example, according to an image recognition technique, the image processing engine 104 compares image data of each of the detected objects with image data of reference objects that are stored in advance, for example, in the autonomous-driving vehicle system 100 or at an external server for identification of the detected objects. For the image recognition, an applicable machine learning technology (including deep learning) is employed in a specific implementation.

In an embodiment, the image processing engine 104 is configured to generate processed image data and provide the processed image data to the control engine 102. For example, the processed image data include the image data obtained from the imaging devices and metadata of identified objects and metadata of detected objects (but not identified). In a more specific example, the metadata include a relative position (including distance) of each detected object from the autonomous-driving vehicle system 100. In another more specific example, the metadata include a model, make, year, and color of each vehicle included in a scene image, a license plate number of each vehicle included in a scene image, a height, predicted gender, predicted age, and clothes of each pedestrian included in a scene image. In another more specific example, the metadata may also include the number of passengers in one or more vehicles included in the scene image.

In the example depicted in FIG. 1, the positioning engine 106 is intended to represent specifically-purposed hardware and software configured to determine absolute position and orientation of the autonomous-driving vehicle system 100 itself and the detected objects. In an embodiment, the positioning engine 106 determines absolute position and orientation of the autonomous-driving vehicle system 100 based on an inputs from the position sensing module 136. In an embodiment, the positioning engine 106 determines absolute position and orientation of one or more detected objects based on the input from the position sensing module 136 and the relative position obtained based on the image processing.

In the example depicted in FIG. 1, the position sensing module 136 intended to represent specifically-purposed hardware and software configured to obtain data to determine a position (e.g. global position) of the autonomous-driving vehicle system 100. In a specific implementation, the position sensing module 136 includes a global positioning system (GPS), a gyro sensor, an acceleration sensor, and so on. Depending on a specific implementation and other consideration, the position sensing module 136 may include two or more positioning sensors, and may be or may not be mounted on an autonomous-driving vehicle corresponding to the autonomous-driving vehicle system 100. For example, the position sensing module 136 may include one or more positioning sensors mounted on the autonomous-driving vehicle and one or more positioning sensors that are not mounted on the autonomous-driving vehicle, and rather placed at external places, such as street lamps, traffic signals, other vehicles, buildings, and so on.

In the example depicted in FIG. 1, the movable object detecting engine 122 is intended to represent specifically-purposed hardware and software configured to detect movable objects from objects detected and identified by the image processing engine 104. In an embodiment, in detecting movable objects, the movable object detecting engine 122 determine whether or not a detected object is an movable object based on attributes of the detected object, such as a type of objects, humans, animals, buildings, vehicles, trees, traffic signals, traffic signs, road obstacles, and so on, and determines that objects determined as humans, animals, vehicles, and so on are determined as the movable objects. Although objects movable by wind power such as trash, objects movable (thrown, projected, pushed, etc.) by human power such as balls, luggage, and so on, are literally "movable," the movable object detecting engine 122 may exclude these "movable objects" that have no physiologic power or human-controllable locomotive power to move from the targets to be detected thereby.

In the example depicted in FIG. 1, the target object selecting engine 124 is intended to represent specifically-purposed hardware and software configured to select target movable object(s) to which a directed alert notification is to be provided. In an embodiment, in selecting the target movable object(s), the target object selecting engine 124 determines one or more candidate movable objects from which the target movable objects are selected. In determining the one or more candidate movable objects, the target object selecting engine 124 determines the candidate movable object(s) from the one or more movable objects according to an applicable criteria. In an embodiment, the applicable criteria may be based on a distance to movable objects. For example, the target object selecting engine 124 may select one or more movable objects within a predetermined distance (e.g., 3 feet) at the current time as the candidate movable objects. In another example, the target object selecting engine 124 may select one or more movable objects distances to which are reducing to a predetermined value within a predetermined period of time as the candidate movable objects.

In an embodiment, the applicable criteria may be based on a vehicle route of the autonomous-driving vehicle and a predicted moving paths of the movable objects. For example, the target object selecting engine 124 determines, as the candidate movable objects, movable objects of which position in their predicted moving paths at a future point in time are within a predetermined distance from the position of the autonomous-driving vehicle in the vehicle route at the future point in time. In another example, the target object selecting engine 124 determines, as the candidate movable objects, movable objects of which position in their predicted moving paths at a future point in time coincide with the position of the autonomous-driving vehicle in the vehicle route at the future point in time. Depending on a specific implementation and other consideration, the vehicle route of the autonomous-driving vehicle is determined by an applicable engine such as the vehicle behavior determination engine 126 as described below, and the target object selecting engine 124 determines the predicted moving paths of the movable objects.

In an embodiment, in determining the predicted moving paths of the movable objects, the target object selecting engine 124 obtains metadata of a movable object and determines a predicted moving path of the movable object based on the obtained metadata. For example, when the movable object is a pedestrian, the target object selecting engine 124 determines a predicted moving path of the pedestrian, such as what positions of a sidewalk a pedestrian passes and what positions of a crosswalk a pedestrian passes, based on metadata of the pedestrian, such as a walking speed, existence of other objects (e.g., other pedestrians and vehicles), body orientation, face direction, and eye direction of the pedestrians, and so on. In another example, when the movable object is a vehicle, the target object selecting engine 124 determines a predicted moving path of the vehicle, such as which lane of a road is going to be used, which parking spot of a parking place (e.g., curb-side parallel parking space) is going to be used, and so on, based on metadata of the vehicle, such as a driving speed, an acceleration or deceleration value, a vehicle orientation, wheel directions, states of lamps (e.g., blinker and tail lamps), existence of other objects (e.g., other pedestrians and vehicles), a car make and specification, and so on. In another example, when the movable object is an animal, the target object selecting engine 124 determines a predicted moving path of the animal based on metadata of the animal, such as type of animal, behavioral attributes of the animal, past move history data of the animal, and so on.

In an embodiment, the target object selecting engine 124 is configured to determine one or more target movable objects from one or more candidate movable objects. In an embodiment, in determining one or more target movable objects from the one or more candidate movable objects, the target object selecting engine 124 may determine the one or more target movable objects according to an applicable criteria. In an embodiment, the applicable criteria may be based on a distance to movable objects. For example, the target object selecting engine 124 may select one or more candidate movable objects closest to the autonomous-driving vehicle (e.g., 3 feet) at the current time as the target movable objects. In another example, the target object selecting engine 124 may select one or more candidate movable objects distances to which becomes closest within a predetermined period of time as the candidate movable objects. In an embodiment, the applicable criteria may be based on an extent of risk of traffic incident involving the candidate movable object. For example, the target object selecting engine 124 may select one or more candidate movable objects that has a highest risk of traffic incident or one or more candidate movable objects of which risk of traffic incident is above a threshold, as the target movable objects. Depending on a specific implementation and other consideration, the risk of traffic incident may be calculated based on various algorithm including a model-based algorithm, a history-matching-based algorithm, and so on.

In an embodiment, the target object selecting engine 124 is configured to determine predicted reactive movement of the target movable objects when directed alert notifications are provided to the target movable objects. Depending on a specific implementation and other consideration, the target object selecting engine 124 may determine the predicted reactive movement based on statistic data (e.g., past reactive movement) associated with a specific type of notification and target movable object, physiological data (e.g., reactive speed) associated with specific type of notification and target movable object, and so on.

In the example depicted in FIG. 1, the vehicle behavior determination engine 126 is intended to represent specifically-purposed hardware and software configured to determine behavior of the autonomous-driving vehicle system 100. In an embodiment, the vehicle behavior determination engine 126 autonomously determines behavior of the autonomous-driving vehicle system 100. More specifically, the vehicle behavior determination engine 126 determines a vehicle route of the autonomous-driving vehicle. In an embodiment, the vehicle route includes a global vehicle route including which road to be used and which intersection to make a turn, and so on, and/or a local vehicle route including which lane of a road to be used, which parking spot of a parking place (e.g., curb-side parallel parking space) to be used, and so on. In an embodiment, the vehicle behavior determination engine 126 determines the vehicle route based on various applicable criteria, such as a current location, a destination, traffic conditions (e.g., congestion, speed limits, number of traffic signals, etc.), weather conditions, environmental conditions (e.g., time, brightness, etc.), geographic crime rates, number of intersection turns, existence of obstacles on roads, etc. In an embodiment, the vehicle behavior determination engine 126 subordinately determines behavior of the autonomous-driving vehicle system 100 based on instructions from an external system (e.g., autonomous-driving vehicle systems of other vehicles, a traffic control server, etc.).

In the example depicted in FIG. 1, the autonomous-driving control engine 108 is intended to represent specifically-purposed hardware and software configured to perform an autonomous-driving operation of the autonomous-driving vehicle system 100 based on the determined behavior of the autonomous-driving vehicle system 100. For example, when the vehicle behavior determination engine 126 determines to change a lane on a road, the autonomous-driving control engine 108 causes the vehicle locomotive mechanism 138 to flash blinker lamps, direct wheels to the lane, and return position of the wheels after changing the lame and stop blinker lamps. For example, when the vehicle behavior determination engine 126 determines to proceed to a specific location (e.g., a parking spot), the autonomous-driving control engine 108 causes the vehicle locomotive mechanism 138 to drive to the specific location. For example, when the vehicle behavior determination engine 126 determines to take a specific route, the autonomous-driving control engine 108 causes the vehicle locomotive mechanism 138 to drive taking the specific route.

In an embodiment, the autonomous-driving control engine 108 is configured to control the vehicle locomotive mechanism 138 based on the predicted reactive movement of the target movable object(s). For example, when a target movable object is a pedestrian and the reactive movement of the target movable object is stop of walk, the autonomous-driving control engine 108 controls the vehicle locomotive mechanism 138 to drive apart from or avoid a stop position of the target movable object. In another example, when a target movable object is an animal and the reactive movement of the target movable object is rushing in a specific direction, the autonomous-driving control engine 108 controls the vehicle locomotive mechanism 138 to drive the autonomous-driving vehicle in a direction different from the specific direction.

In the example depicted in FIG. 1, the vehicle locomotive mechanism 138 is intended to represent specifically-purposed mechanism to drive an autonomous-driving vehicle. Depending on a specific implementation and other consideration, the vehicle locomotive mechanism 138 may include an electrical power and drive unit, such as a motor, to drive the autonomous-driving vehicle, and/or a fuel-based power and drive unit such as an engine. Depending on a specific implementation and other consideration, the vehicle locomotive mechanism 138 may be controlled based on mechanical control actions triggered by the autonomous-driving control engine 108 and/or electrical signals generated by the autonomous-driving control engine 108.

In the example depicted in FIG. 1, the perceptibility parameter determination engine 128 is intended to represent specifically-purposed hardware and software configured to determine perceptibility parameter(s) of one or more target movable objects. In an embodiment, the one or more perceptibility parameters comprises at least one of a visual perceptibility level, an acoustic perceptibility level, a somatosensory perceptibility level, and a via-electronic-device perceptibility level.

In an embodiment, a visual perceptibility level is expressed by a scalar value, and determined, for example, based on a direction of eyes of a target movable object (e.g., a pedestrian) and/or a driver of a target movable object (e.g., vehicle), possession of features unique to visual impairment such as a white cane, a guide dog accompanying with the target movable object, a sticker indicating visual impairment, and so on, which are obtained from image data processed by applicable engine such as the image processing engine 104. In an embodiment, an acoustic perceptibility level is expressed by a scalar value and determined, for example, based on coverage of ears of a target movable object by instruments (e.g., ear plugs, a telephone, a headphone, etc.) and possession of features unique to acoustic impairment such as a guide dog accompanying with the target movable object, which are obtained from image data processed by applicable engine such as the image processing engine 104. In an embodiment, a somatosensory perceptibility is expressed by a scalar value and determined, for example, based on coverage of a body of a target movable object by garments, which are obtained from image data processed by applicable engine such as the image processing engine 104. In an embodiment, a via-electronic-device perceptibility level is expressed by a scalar value and determined, for example, based on use of electronic devices such as smartphones, game instruments, music instruments, smart watches, and so on, which are obtained from image data processed by applicable engine such as the image processing engine 104. In an embodiment, the perceptibility parameter determination engine 128 determines one or more perceptibility parameters also based on one or more environmental attributes, including one or more of weather condition, an ambient brightness level, and an ambient noise level.

In the example depicted in FIG. 1, the directed alert notification engine 110 is intended to represent specifically-purposed hardware and software configured to cause a directed alert notification to be generated toward one or more target movable objects. In an embodiment, in causing a directed alert notification to be generated, the directed alert notification engine 110 determines the manner of generating the directed alert notification. In an embodiment, the manner of generating a directed alert notification includes a type of the directed alert notification, which may include one or more of a visual directed alert notification, an acoustic directed alert notification, a somatosensory directed alert notification, and an electromagnetic directed alert notification. In an embodiment, the directed alert notification engine 110 determines the type of the directed alert notification based on one or more perceptibility parameters. For example, the directed alert notification engine 110 determines a visual directed alert notification as the type of the directed alert notification, when a visual perceptibility parameter of a target movable object is higher than a certain level (e.g., above 8 out of 10). In another example, the directed alert notification engine 110 determines an acoustic directed alert notification as the type of the directed alert notification, when a visual perceptibility parameter of a target movable object is lower than a certain level (e.g., below 5 out of 10) and an acoustic perceptibility parameter of the target movable object is higher than a certain level (e.g., above 8 out of 10). In still another example, the directed alert notification engine 110 determines a somatosensory directed alert notification as the type of the directed alert notification, when a somatosensory perceptibility parameter the target movable object is higher than a certain level (e.g., above 9 out of 10). Depending on a specific implementation and other consideration, the directed alert notification engine 110 may select two or more types of directed alert notifications for the alert notification to a target movable object.

In an embodiment, the manner of generating a directed alert notification includes a position to which the directed alert notification is directed. In an embodiment, the directed alert notification engine 110 determines the position to which the directed alert notification is directed based on image data of a target movable object and/or one or more perceptibility parameters. More specifically, in an embodiment, the directed alert notification engine 110 determines the position to which the directed alert notification is directed so as to call attention of the target movable object. For example, the directed alert notification engine 110 determines an item (e.g., smart phone, book, watch, etc.) that a target movable object is looking at as the position to which the directed alert notification is directed, when the directed alert notification engine 110 determines a visual directed alert notification as the type of the directed alert notification. In another example, the directed alert notification engine 110 determines an ear of a target movable object, when the directed alert notification engine 110 determines an acoustic directed alert notification as the type of the directed alert notification. In another example, the directed alert notification engine 110 determines an electronic device used by a target movable object, when the directed alert notification engine 110 determines a via-electronic-device directed alert notification as the type of the directed alert notification.

In an embodiment, the directed alert notification engine 110 determines the position to which the directed alert notification is directed so as to indicate a position to which the corresponding autonomous-driving vehicle is moving. For example, the directed alert notification engine 110 determines a position on a road to which a visual directed alert notification is directed to indicate the direction of an autonomous-driving vehicle. In an embodiment, the directed alert notification engine 110 determines the position to which the directed alert notification is directed so as to direct a target movable object towards the position. For example, the directed alert notification engine 110 determines a position on a sidewalk or a position on a wall to direct an animal toward the position and clear a path for the autonomous-driving vehicle, when the directed alert notification engine 110 determines a visual directed alert notification as the type of the directed alert notification and the target movable object is an animal. Depending on a specific implementation and other consideration, the position to which the directed alert notification is directed may be a fixed position or move (e.g., move away from vehicle, wave, etc.). Depending on a specific implementation and other consideration, the position to which the directed alert notification is directed may be determines so as not to harm target movable objects (e.g., eyes when a laser is used as a visual directed alert notification).

In an embodiment, the manner of generating a directed alert notification includes timing at which a directed alert notification is generated. In an embodiment, the directed alert notification engine 110 determines the timing at which the directed alert notification is generated based on image data of a target movable object and/or one or more perceptibility parameters. For example, the timing is as soon as the type and the position of the directed alert notification are determined. In another example, the timing is at a specific future point in time when a speed of an autonomous-driving vehicle decreases below a predetermined value (e.g., 10 mph) and/or when the speed of the autonomous-driving vehicle increases above a predetermined value, to indicate a direction to which the autonomous-driving vehicle proceeds. In another example, the timing is at a specific future point in time when a space longer than a predetermined distance is generated in front of an autonomous-driving vehicle, to avoid confusion, i.e., confusion about which vehicle is generating a directed alert notification. Depending on a specific implementation and other consideration, the timing at which the directed alert notification is generated may be a single timing or multiple timing.

In the example depicted in FIG. 1, the directed alert notification module 140 is intended to represent specifically-purposed module configured to generate a directed alert notification in accordance with the manner determined by the directed alert notification engine 110. In an embodiment, in generating a visual directed alert notification, the directed alert notification module 140 includes a laser pointing device and/or other directive optical devices to selectively deliver the directed alert notification to a target movable object. In a specific implementation, the laser pointing device is configured to generate a laser in a wavelength range (e.g., 600-700 nm) and a laser safety class (e.g. class 1) that are harmless to human eyes and/or animal eyes. In a specific implementation, a shape of a laser point illumination may be one or more of applicable shapes, including a dot, line, an arrow (e.g., an arrow indicating a direction of vehicle), a finger pointing a direction, a text (e.g., a text indicating what a vehicle is going to do), an emoji, a unique mark (e.g., maker logo, model logo, etc.) for target movable object(s) to identify a vehicle generating the laser, a mark (e.g., bug shape) to attract animals, and so on. In an embodiment, in generating an acoustic directed alert notification, the directed alert notification module 140 includes a parametric speaker and/or other directive speakers to selectively deliver the directed alert notification to a target movable object. In an embodiment, in generating a somatosensory directed alert notification, the directed alert notification module 140 includes a directive disk heater and/or other directive devices (e.g., air cannon generator) to selectively deliver the directed alert notification to a target movable object. In an embodiment, in generating a via-electronic-device directed alert notification, the directed alert notification module 140 includes a jamming signal generator. In a specific implementation, a jamming signal generator may be a radio transmitter to deliver a specific voice message to a radio receiver used by a target movable object (e.g., pedestrian) or a driver of a target movable object (e.g., vehicle). In a specific implementation, a jamming signal generator may deliver jamming signal to jam display images on a screen of a device used by a target movable object and/or audio signals generated to a target movable object.

Figure 2:
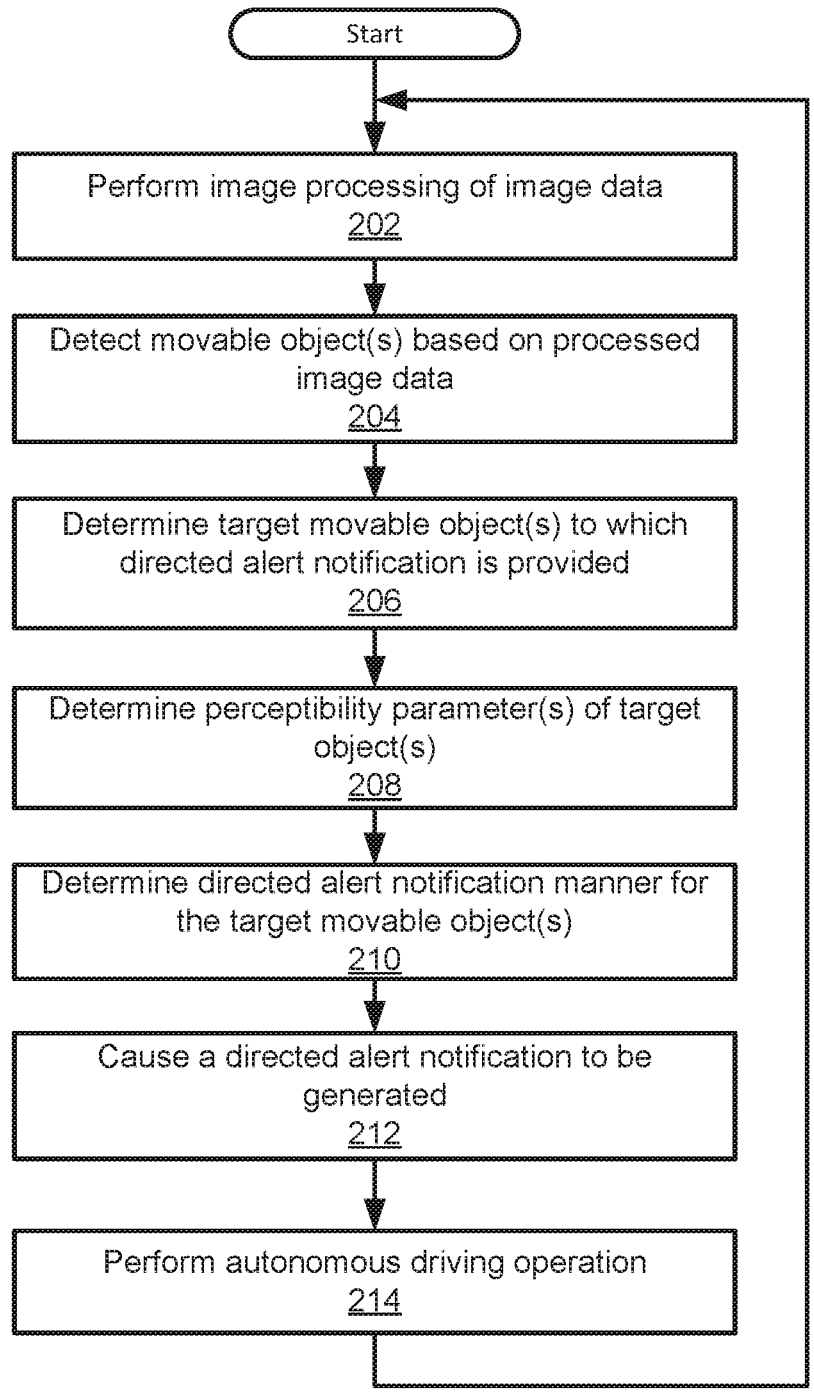
FIG. 2 depicts a flowchart of an example of a method for operating an autonomous-driving vehicle system.

FIG. 2 depicts a flowchart 200 of an example of a method for operating an autonomous-driving vehicle system. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. In the example of FIG. 2, the flowchart 200 starts at module 202, with performing image processing of image data. An applicable engine for performing image processing, such as an image processing engine (e.g., the image processing engine 104 in FIG. 1) described in this paper, can perform the image processing. In an embodiment, objects included in scene images captured by imaging devices are detected, the detected objects are then identified according to an image recognition technique, and relative position and orientation of the detected objects from an autonomous-driving vehicle system are determined in the module 202.

In the example of FIG. 2, the flowchart 200 continues to module 204, with detecting movable object(s) based on processed image data. An applicable engine for detecting movable objects, such as a movable object detecting engine (e.g., the movable object detecting engine 122 in FIG. 1) described in this paper, can detect movable object(s) based on processed image data. In an embodiment, whether or not a detected object is an movable object is determined based on attributes of the detected object, such as a type of objects, humans, animals, buildings, vehicles, trees, traffic signals, traffic signs, road obstacles, and so on. For example, objects movable based on their intentions and/or control programs, such as humans, animals, and vehicles (both non-autonomous-driving and autonomous-driving vehicles) are determined as movable objects. In an embodiment, the movable object(s) may be detected based on a non-image-based detection technique such as techniques employing Lidar, ultrasonic waves, and so on.

In the example of FIG. 2, the flowchart 200 continues to module 206, with determining target movable object(s) to which a directed alert notification is provided. An applicable engine for determining target movable object(s) to which a directed alert notification is provided, such as a target movable object selecting engine (e.g., the target movable object selecting engine 124 in FIG. 1) described in this paper, can determine target movable object(s) to which a directed alert notification is provided. In an embodiment, in determining the target movable object(s), the target movable object(s) are selected from the one or more movable objects based on an applicable criteria, such as a distance to a movable object and a time period before a distance to a movable object decreases to a minimum distance (e.g., contact with the candidate movable object) below a predetermined distance (e.g., 3-10 feet), and one or more movable objects involving one of the highest risks of traffic incident (e.g., shortest distance and/or shortest time period) may be selected as the one or more target movable objects.

In the example of FIG. 2, the flowchart 200 continues to module 208, with determining perceptibility parameter(s) of the one or more target movable objects. An applicable engine for determining perceptibility parameter(s) of the one or more target movable objects, such as a perceptibility parameter determination engine (e.g., the perceptibility parameter determination engine 128 in FIG. 1) described in this paper, can determine the perceptibility parameter(s) of the one or more target movable objects. In an embodiment, the one or more perceptibility parameters comprises at least one of a visual perceptibility level, an acoustic perceptibility level, a somatosensory perceptibility level, and a via-electronic-device perceptibility level. In an embodiment, the one or more perceptibility parameters are determined at least based on a portion of processed image data corresponding to the target movable object(s), and optionally based on one or more environmental attributes, including one or more of weather condition, an ambient brightness level, and an ambient noise level.

In the example of FIG. 2, the flowchart 200 continues to module 210, with determining a manner of a directed alert notification to be directed to the target movable object(s). An applicable engine for determining a manner of a directed alert notification such as a directed alert notification engine (e.g., the directed alert notification engine 110 in FIG. 1) described in this paper, can determine the manner of the directed alert notification to be directed to the target movable object(s). In an embodiment, the manner of generating a directed alert notification includes a type of the directed alert notification, and the type of the directed alert notification is selected from a group including one or more of a visual directed alert notification, an acoustic directed alert notification, a somatosensory directed alert notification, and an electromagnetic directed alert notification, at least based on the one or more perceptibility parameters. In an embodiment, the manner of generating a directed alert notification includes a position to which the directed alert notification is directed, and the position to which the directed alert notification is directed is determined based on image data of a target movable object and/or the one or more perceptibility parameters. In an embodiment, the manner of generating a directed alert notification includes timing at which the directed alert notification is generated, and the timing at which the directed alert notification is generated is determined based on image data of a target movable object and/or the one or more perceptibility parameters.

In the example of FIG. 2, the flowchart 200 continues to module 212, with causing a directed alert notification to be generated according to the determined manner of directed alert notification. An applicable engine for causing a directed alert notification to be generated, such as a directed alert notification engine (e.g., the directed alert notification engine 110 in FIG. 1) described in this paper, can cause the directed alert notification to be generated by an applicable module for generating the directed alert notification, such as a directed alert notification module (e.g., the directed alert notification module 140 in FIG. 1) according to the determined manner of directed alert notification. In an embodiment, the directed alert notification is of a determined type (e.g., a visual directed alert notification), directed to a determined position (e.g., a hand of a pedestrian), at determined timing (e.g., when a signal for the pedestrian is about to turn green).

In the example of FIG. 2, the flowchart 200 continues to module 214, with performing an autonomous driving operation. An applicable engine for performing an autonomous driving operation, such as an autonomous driving control engine (e.g., the autonomous driving control engine 108 in FIG. 1) described in this paper, can perform the autonomous driving operation by controlling an applicable locomotive mechanism (e.g., the vehicle locomotive mechanism 138 in FIG. 1) of an autonomous-driving vehicle. In an embodiment, in performing an autonomous driving operation, predicted movement of the target movable object(s) in response to the directive alert notification is determined, and the locomotive mechanism of the autonomous-driving vehicle is controlled based on the predicted movement of the target movable object(s). In the example of FIG. 2, the flowchart 200 returns to module 202, and module 202 through module 214 are repeated.

Figure 3:
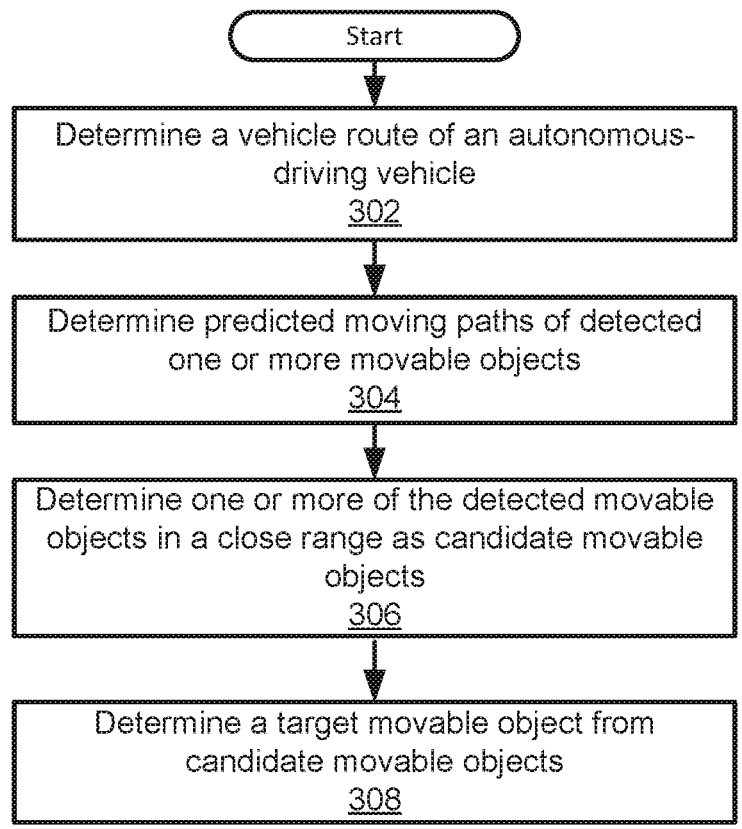
FIG. 3 depicts a flowchart of an example of a method for determining a target movable object to which a directed alert notification is generated.

FIG. 3 depicts a flowchart 300 of an example of a method for determining a target movable object to which a directed alert notification is generated. In the example of FIG. 3, the flowchart 300 starts at module 302, with determining a vehicle route of an autonomous-driving vehicle. An applicable engine for determining a vehicle route of an autonomous-driving vehicle, such as a vehicle behavior determination engine (e.g., the vehicle behavior determination engine 126 in FIG. 1) described in this paper, can determine the vehicle route of the autonomous-driving vehicle. In an embodiment, the vehicle route includes a global vehicle route including which road to be used and which intersection to make a turn, and so on, and/or a local vehicle route including which lane of a road to be used, which parking spot of a parking place (e.g., curb-side parallel parking space) to be used, and so on. In an embodiment, the vehicle route is determined based on various applicable criteria, such as a current location, a destination, traffic conditions (e.g., congestion, speed limits, number of traffic signals, etc.), weather conditions, environmental conditions (e.g., time, brightness, etc.), geographic crime rates, number of intersection turns, existence of obstacles on roads, etc.

In the example of FIG. 3, the flowchart 300 continues to module 304, with determining predicted moving paths of detected one or more movable objects. An applicable engine for determining predicted moving paths of detected one or more movable objects, such as a target object selection engine (e.g., the target object selection engine 124 in FIG. 1) described in this paper, can determine the predicted moving paths of the detected one or more movable objects. In an embodiment, a predicted moving path of a movable object includes a local pedestrian route such as what positions of a sidewalk a pedestrian passes, what positions of a crosswalk a pedestrian passes, when the movable object is a pedestrian. In an embodiment, a predicted moving path of a movable object includes a local vehicle route such as which lane of a road is going to be used, which parking spot of a parking place (e.g., curb-side parallel parking space) is going to be used, and so on, when the movable object is a vehicle. In an embodiment, a predicted moving path of a movable object includes a local animal route, when the movable object is an animal. In an embodiment, a predicted moving path of a movable object is determined based on various applicable criteria.

For example, when the movable object is a pedestrian, the criteria to determine the predicted moving path may include a current pedestrian state, such as a current walking speed, a current orientation of the body, a current direction of the face, a current direction of the eyes, and so on, and a current environmental state, such as state of traffic signals therearound, state of other pedestrians and vehicles therearound, and so on. In another example, when the movable object is a vehicle, the criteria to determine the predicted moving path may include a current vehicle state, such as a current driving speed, a current power (engine) state (e.g., on or off), a current orientation of the vehicle, a current acceleration (or deceleration) of the vehicle, a current lamp state (e.g., blinker lamps and/or tail lamps), a current direction of tires, a current position of the vehicle on road (e.g., lane), and so on, and a current environmental state, such as state of traffic signals therearound, state of other vehicles and other pedestrians therearound, and so on. In another example, when the movable object is an animal, the criteria to determine the predicted moving path may include a type of the animal, previous moving paths taken by animals, and so on.

In the example of FIG. 3, the flowchart 300 continues to module 306, with determining one or more of the detected movable objects in a close range of the autonomous-driving vehicle as candidate movable objects. An applicable engine for determining candidate movable objects, such as a target object selection engine (e.g., the target object selection engine 124 in FIG. 1) described in this paper, can determine the candidate movable objects. In an embodiment, the movable objects of which predicted moving path crosses the vehicle route of the autonomous-driving vehicle are determined as the candidate movable objects. In another embodiment, the movable objects of which position in the predicted moving path becomes within a predetermined distance (e.g., 5 feet) from a position of the autonomous-driving vehicle in the vehicle route at a point in time are determined as the candidate movable objects.

In the example of FIG. 3, the flowchart 300 continues to module 308, with determining one or more target movable objects from the candidate movable objects. An applicable engine for determining one or more target movable objects, such as a target object selection engine (e.g., the target object selection engine 124 in FIG. 1) described in this paper, can determine the one or more target movable objects. In an embodiment, one or more of the candidate movable objects of which distance from the autonomous-driving vehicle becomes shortest may be selected as the one or more target movable objects. In an embodiment, one or more of the candidate movable objects of which risk of traffic incident is the largest, which may be calculated in accordance with specific algorithm including machine learning technology, may be selected as the one or more target movable objects. Depending on a specific implementation and other consideration, one target movable object may be selected at a time, or multiple target movable objects may be selected together.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
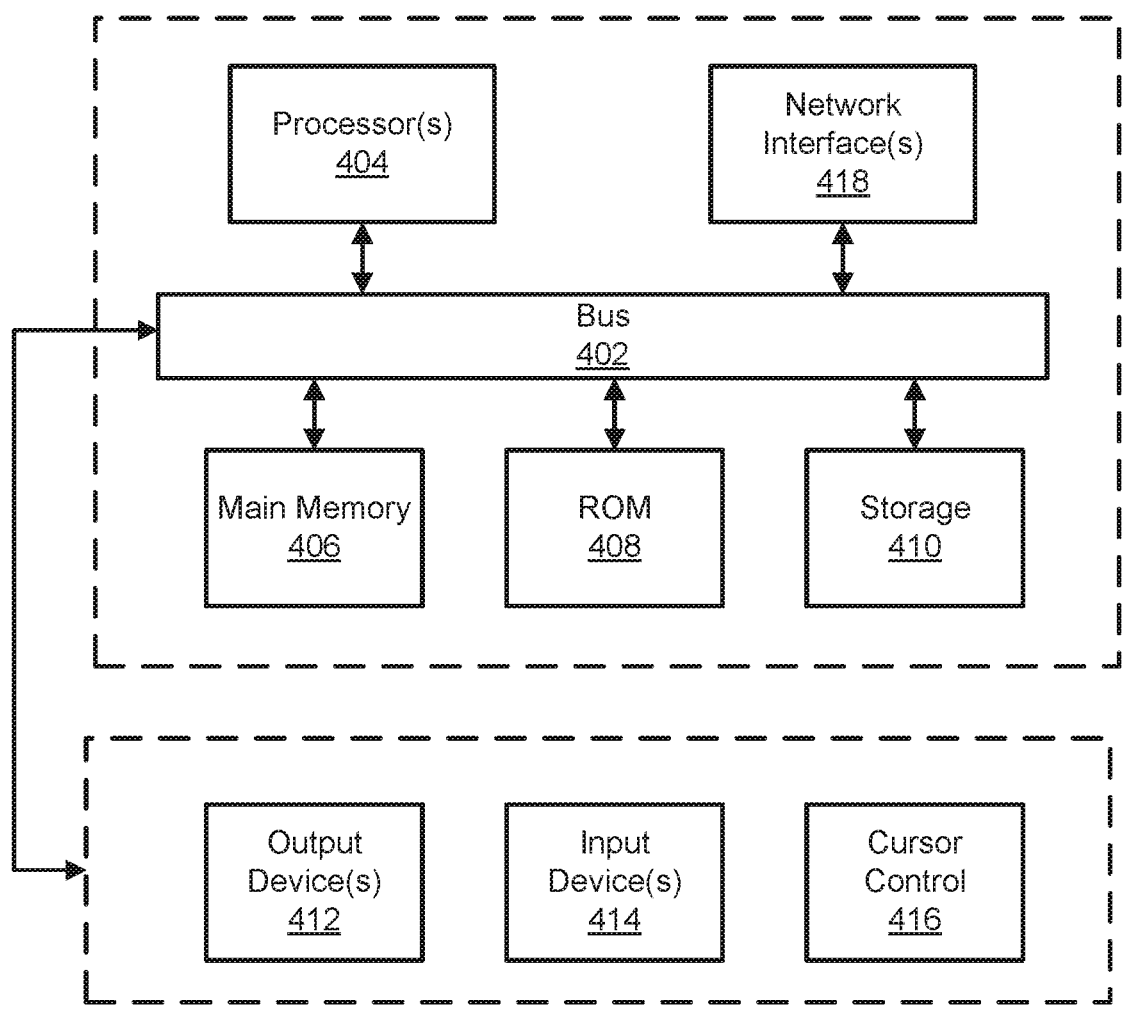
FIG. 4 is a block diagram that illustrates a computer system upon which any of the embodiments described herein may be implemented.

FIG. 4 is a block diagram that illustrates a computer system 400 upon which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to output device(s) 412, such as a cathode ray tube (CRT) or LCD display (or touch screen), for displaying information to a computer user. Input device(s) 414, including alphanumeric and other keys, are coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieves and executes the instructions. The instructions received by main memory 406 may optionally be stored on storage device 410 either before or after execution by processor 404.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for a vehicle, comprising:
   one or more processors; and memory storing instructions that, when executed by the one or more processors, cause the one or more processors to: detect one or more movable objects;
   determine a target movable object from the one or more detected movable objects, the determining the target movable object comprising:
      selecting a movable object based on a criteria, the criteria being based on any of a distance from the vehicle to the one or more movable objects at a current or a future time or a risk of a traffic incident caused by the one or more movable objects;
   determine a manner of generating a directed alert notification selectively toward the target movable object comprising:
      directing an optical device in a bug shape in response to the target movable object being an animal; and
   cause the directed alert notification of the determined manner to be generated toward the target movable object.

2. The system of claim 1, wherein the instructions cause the one or more processors to:

determine a vehicle route of the vehicle;
determine predicted moving paths of the detected one or more movable objects based on metadata of the one or more movable objects, the metadata being based on a type of the one or more movable objects;
determine one or more of the detected movable objects that are predicted to be within a predetermined distance from the vehicle as one or more candidate movable objects, based on the vehicle route and the predicted moving paths of the one or more movable objects; and
determine the target movable object from the one or more candidate movable objects based on the criteria.

3. The system of claim 2, wherein, in response to the type of the one or more movable objects being a pedestrian, the metadata comprises a walking speed, an existence of other movable objects, body orientation face direction, or eye direction; and
the determining predicted moving paths comprises predicting positions of a sidewalk the pedestrian passes or positions of a crosswalk the pedestrian passes, based on the metadata.

4. The system of claim 2, wherein, in response to the type of the one or more movable objects being a vehicle, the metadata comprises a driving speed, an acceleration value, a deceleration value, a vehicle orientation, wheel directions, states of lamps, or an existence of other movable objects, a make of the vehicle, or a specification of the vehicle; and
the determining predicted moving paths comprises predicting a lane of a road is to be used, or a parking spot to be used, based on the metadata.

5. The system of claim 2, wherein, in response to the type of the one or more movable objects being an animal, the metadata comprises a type of the animal, a behavioral attribute of the animal, or past move history of the animal; and
the determining predicted moving paths comprises predicting a lane of a road to be used, or a parking spot to be used, based on the metadata.

6. The system of claim 2, wherein the determining a vehicle route of the vehicle is based on a geographic crime rate.

7. The system of claim 1, wherein the instructions further cause the one or more processors to:
predict a reactive movement of the target movable object in response to the directed alert notification being generated; and
control a locomotion of the vehicle based on the predicted reactive movement.

8. The system of claim 7, wherein, in response to a type of the target movable object being a pedestrian, and in response to the predicted reactive movement of the target movable object being stopping, the controlling the locomotion of the vehicle comprises driving apart from or avoiding a stop position of the target movable object.

9. The system of claim 7, wherein, in response to a type of the target movable object being a animal, and in response to the predicted reactive movement of the target movable object being rushing in a direction, the controlling the locomotion of the vehicle comprises driving the vehicle in a different direction.

10. The system of claim 1, wherein the determining a manner of generating a directed alert notification selectively toward the target movable object comprises determining a timing of generating the directed alert notification in response to determining a type of the directed alert notification and a position of the directed alert notification.

11. The system of claim 1, wherein the determining a manner of generating a directed alert notification selectively toward the target movable object comprises determining a timing of generating the directed alert notification to be a time when a speed of the vehicle decreases below or increases above a predetermined value.

12. The system of claim 1, wherein the determining a manner of generating a directed alert notification selectively toward the target movable object comprises determining a timing of generating the directed alert notification to be a time when a separation between the vehicle and another nearest vehicle is greater than a threshold distance.

13. The system of claim 1, wherein the determining a manner of generating a directed alert notification comprises selecting any of a visual directed alert notification, an acoustic directed alert notification, a somatosensory directed alert notification, or an electromagnetic directed alert notification, based at least in part on a visual perceptibility level, an acoustic perceptibility level, a somatosensory perceptibility level, and a via-electronic-device perceptibility level.

14. A computer-implemented method performed in a vehicle comprising:
detecting one or more movable objects;
determining a target movable object from the one or more detected movable objects, the determining the target movable object comprising:
selecting a movable object based on a criteria, the criteria being based on any of a distance from the vehicle to the one or more movable objects at a current or a future time or a risk of a traffic incident caused by the one or more movable objects;
determining a manner of generating a directed alert notification selectively toward the target movable object comprising:
directing an optical device in a bug shape in response to the target movable object being an animal; and
causing the directed alert notification of the determined manner to be generated toward the target movable object.

15. The computer-implemented method of claim 14, further comprising:
determining a vehicle route of the vehicle;
determining predicted moving paths of the detected one or more movable objects based on metadata of the one or more movable objects, the metadata being based on a type of the one or more movable objects;
determining one or more of the detected movable objects that are predicted to be within a predetermined distance from the vehicle as one or more candidate movable objects, based on the vehicle route and the predicted moving paths of the one or more movable objects; and
determining the target movable object from the one or more candidate movable objects based on the criteria.

16. The computer-implemented method of claim 14, further comprising:
predicting a reactive movement of the target movable object in response to the directed alert notification being generated; and
controlling a locomotion of the vehicle based on the predicted reactive movement.

17. The computer-implemented method of claim 14, wherein the determining a manner of generating a directed alert notification selectively toward the target movable object comprises determining a timing of generating the directed alert notification in response to determining a type of the directed alert notification and a position of the directed alert notification.

18. The computer-implemented method of claim 14, wherein the determining a manner of generating a directed alert notification selectively toward the target movable object comprises determining a timing of generating the directed alert notification to be a time when a speed of the vehicle decreases below or increases above a predetermined value.

19. The computer-implemented method of claim 14, wherein the determining a manner of generating a directed alert notification selectively toward the target movable object comprises determining a timing of generating the directed alert notification to be a time when a separation between the vehicle and another nearest vehicle is greater than a threshold distance.

20. A non-transitory computer readable medium comprising instructions that, when executed, cause one or more processors to perform:

detecting one or more movable objects;

determining a target movable object from the one or more detected movable objects, the determining the target movable object comprising:
  selecting a movable object based on a criteria, the criteria being based on any of a distance from the vehicle to the one or more movable objects at a current or a future time or a risk of a traffic incident caused by the one or more movable objects;

determining a manner of generating a directed alert notification selectively toward the target movable object, comprising:
  directing an optical device in a bug shape in response to the target movable object being an animal; and causing the directed alert notification of the determined manner to be generated toward the target movable object.

* * * * *